United States Patent [19]

Fujie et al.

[11] 4,176,273
[45] Nov. 27, 1979

[54] LIGHT AND HEAT WRITING PEN FOR PHOTOSENSITIVE MATERIAL

[75] Inventors: Tetsuo Fujie, Yokohama; Hiromi Ito, Hachioji, both of Japan

[73] Assignee: Olympus Optical Company Limited, Tokyo, Japan

[21] Appl. No.: 843,347

[22] Filed: Oct. 18, 1977

[30] Foreign Application Priority Data

Oct. 19, 1976 [JP] Japan .................. 51/140320[U]
Oct. 20, 1976 [JP] Japan .................. 51/125029

[51] Int. Cl.$^2$ .................. H05B 1/00; B43K 29/10
[52] U.S. Cl. .................. 219/220; 128/397;
219/216; 219/229; 219/240; 354/105; 362/32; 362/118
[58] Field of Search ........ 219/227, 220, 229, 236–241, 219/346, 216; 362/18, 109, 118, 32, 92; 128/395–398; 401/1, 2; 354/105

[56] References Cited
U.S. PATENT DOCUMENTS

| 439,238 | 10/1890 | Faught | 219/229 X |
|---|---|---|---|
| 1,381,194 | 6/1921 | Homan | 128/395 X |
| 1,447,730 | 3/1923 | Post | 219/238 |
| 1,455,842 | 5/1923 | Kelly | 219/240 |
| 1,656,690 | 1/1928 | Blackburn | 219/236 |
| 1,744,720 | 1/1930 | Blackburn | 219/240 |
| 1,875,048 | 8/1932 | Levene | 354/105 |
| 2,368,839 | 2/1945 | Jansen | 362/32 X |
| 2,533,955 | 12/1950 | Pitts | 128/396 |
| 2,598,900 | 6/1952 | Frye | 219/237 |
| 3,969,606 | 7/1976 | Veach | 219/229 X |

*Primary Examiner*—A. Bartis
*Attorney, Agent, or Firm*—Haseltine, Lake & Waters

[57] ABSTRACT

A writing pen for heat developing photoconductive material including a pen having a nib formed of material of high thermal conductivity and pervious to light, for contacting photosensitive heat developing material. The pen has a light source for illuminating the photosensitive material through the pen nib contacting the material, and a heater embedded in the nib for heating the nib portion in contact with photosensitive material. The pen nib may include a light-pervious rotatable ball tip seated in a light-pervious ball receptacle.

2 Claims, 4 Drawing Figures

LIGHT AND HEAT WRITING PEN FOR PHOTOSENSITIVE MATERIAL

BACKGROUND OF THE INVENTION

The present invention relates to a writing pen for photosensitive material which can write a drawing, symbol, character or the like on heat developing type photosensitive material.

In order to write a drawing, symbol, character or the like in an overlapped manner on the photosensitive material in which record has already been made after exposure and heat development, the following methods have been employed in general so far. That is to say, the record is made by re-exposing and re-heat developing in accordance with the drawing, symbol, character or the like to be recorded, or the drawing, symbol, character or the like is recorded on the photosensitive material by ink, regardless of the optical change of the photosensitive material. The former method, however, takes time and various processes and thus is very inconvenient. In the latter method, if the photosensitive material on which the record has been made by ink is handled for further processes before the ink dries up, the photosensitive material is made dirty by the ink and accordingly a wait for drying the ink is required, so that this latter method also takes time.

Heat developing type photosensitive material has a characteristic that a portion thereof which has not been developed does not show an optical change no matter how the portion was exposed and that the optical change occurs only when the photosensitive material is heated. As a result, if the exposed photosensitive material is heat developed partially in the form of drawing, symbol or character, the optical change occurs at that portion where the photosensitive material is heat developed, so that the drawing, symbol, character or the like can be further recorded on the photosensitive material. Among the photosensitive materials, activating type photosensitive material has a characteristic that the photosensitive material is not excited unless the photosensitive material is exposed in a condition where the photosensitive material is activated by heating the material. As a result, if the exposed photosensitive material is heat developed partially in the form of drawing, symbol, character or the like, the optical change occurs at the portion where the photosensitive material is heat developed, so that the drawing, symbol, character or the like can be further recorded in the photosensitive material.

SUMMARY OF THE INVENTION

An object of the present invention is to provide a writing pen for photosensitive material which can write a drawing, symbol, character or the like in photosensitive material after the heat developing type photosensitive material is partially heat developed. The present invention utilizes the above mentioned characteristic of the heat developing type photosensitive material.

Another object of the present invention is to provide a writing pen for photosensitive material which can write a drawing, symbol character or the like in photosensitive material after the heat developing type photosensitive material is partially heated and exposed.

A writing pen for photosensitive material according to the present invention comprises a pen portion having at least a pen nib formed by thermally conductive material and touching heat developing type photosensitive material and a heater for heating the heat developing type photosensitive material which touches the pen nib. A light source in the pen illuminates the photosensitive material through the pen nib which is light-pervious.

In one embodiment of the present invention, the pen nib is provided with a rotatable ball which is formed by light-pervious material.

In the present invention, the pen nib which touches the heat developing type photosensitive material is formed by material having good thermal conductivity and light perviousness, and further the writing pen of this embodiment comprises a light source for illuminating the photosensitive material of heat developing type which touches the pen nib and a heater for heating the photosensitive material.

PREFERRED EMBODIMENTS OF THE INVENTION

Figure 1:
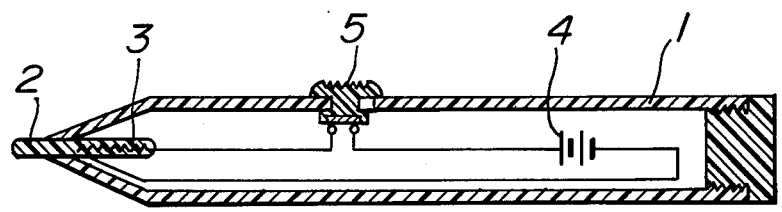
FIG. 1 is a longitudinal sectional view showing one embodiment of a writing pen for photosensitive material according to the present invention.

A writing pen for photosensitive material according to the present invention shown in FIG. 1 has a hollow pen holder 1 which is formed by heat insulating material and a pen nib 2 which is formed by a good conductor of heat. A nib end portion of the pen nib 2 which is projected from the pen holder 1 has a smoothly spherical form so that a friction against the photosensitive material is lessened during the writing so as to prevent the photosensitive material from being damaged. A base portion of the pen nib 2 which is extended in the hollow pen holder 1 is provided with a heater 3. The heater 3 heats the pen nib 2 at suitable temperatures (from 100° C. to 120° C.). A battery 4 is installed in the pen holder 1 so that the battery 4 supplies an electric power to the heater 3 through a switch 5. The switch 5 is arranged at a suitable position on a surface of the pen holder 1 and controls the power supply to the heater by manipulating the switch 5 in an ON-OFF mode.

Figure 2:
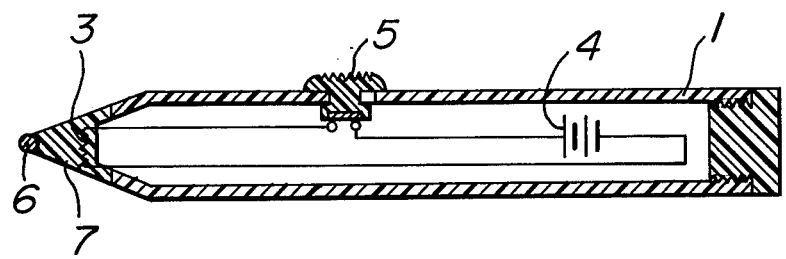
FIG. 2 is a longitudinal sectional view showing a second embodiment of a writing pen according to the present invention.

In a second embodiment of the present invention, the pen nib is formed by a ball tip, as shown in FIG. 2. In FIG. 2, a ball 6 and a ball receptacle 7 are formed by material having high thermal conductivity. The ball 6 can freely rotate in the ball receptacle 7. The ball receptacle 7 is provided with the heater 3 so that both of the ball receptacle 7 and the ball 6 are heated. In this embodiment, the pen nib moves on the photosensitive material while the ball is rotating in the case of writing, so that the pen is improved to write well and that there is less concern that the photosensitive material is damaged.

Even though a heat developing type film has been exposed and then developed, an emulsion layer of the film is not necessarily exposed to change its condition to a saturated condition. Even in the case of heat development, the film does not receive thermal energy which is sufficient to change the emulsion layer of the film to the saturated condition. Accordingly, while the developed film is handled at an illuminated location, the emulsion layer is further exposed, but a visible change does not occur unless a thermal energy having a given value or more is given. The pen nib 2 in the embodiment shown in FIG. 1 or the ball 6 in the embodiment shown in FIG. 2 is heated by the heater 3 when the switch 5 is closed. If this heated pen nib 2 or ball 6 touches on the film surface of the film which is already exposed to write a drawing, symbol or character on the film, then the written portion is heat developed to produce an optical change and the written drawing, symbol or character is recorded in the film. In the case of a film which is not exposed and not developed, it is also possible to record in that film, if the drawing, symbol or character is written on the film at a light place.

Figure 3:
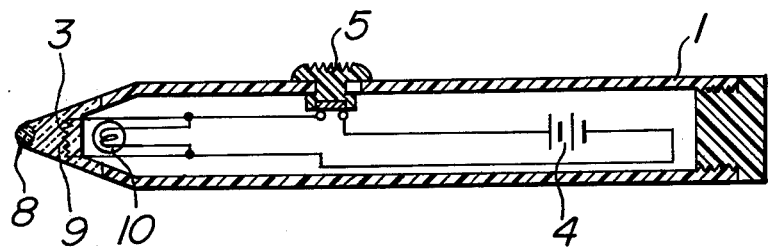
FIG. 3 is a longitudinal sectional view showing a third embodiment of a writing pen according to the present invention.

FIG. 3 is a longitudinal sectional view of a third embodiment of the present invention. In FIG. 3, the hollow pen holder 1 is formed by heat insulating material. The pen nib portion of the pen holder 1 has a ball set having a ball 8 and a ball receptacle 9. A part of the ball 8 is projected from the ball receptacle 9 at the end portion of the pen nib and the ball 8 can rotate freely in the ball receptacle 9. As a result, if the pen nib is moved while the ball 8 touches the photosensitive material, the ball 8 rotates to move on the photosensitive material, so that the writing feeling is smooth and that there is less concern about the damage of the photosensitive material. Further, the ball 8 is required to be a good conductor of heat as well as to be formed from light pervious solid material. The ball receptacle 9 is also formed from a good conductor of heat. At least a part of the ball receptacle 9 which is parallel to the line connecting the ball 8 and a light source 10 is required to be light pervious so that an illuminating light radiating from the light source 10 which is provided in the pen holder 1 can radiate to the outside of the pen through the ball 8. The heater 3 is mounted in the ball receptacle 9 so that the ball receptacle 9 and the ball 8 are heated to the required temperature (100° C. through 120° C.) by the heating of this heater 3. The light source 10 and the heater 3 are connected in parallel. This parallel connection is connected to the battery 4 installed in the pen holder 1 through the switch 5. The manipulating part of the switch 5 is arranged at a suitable position of the outer surface of the pen holder 1. The current flowing to the light source 10 and the heater 3 from the battery 4 is controlled in an ON-OFF mode by the manipulation of the switch 5.

If the switch 5 is closed, the light source 10 emits light and the heater 3 is heated. Then, the ball 8 is heated a temperature from 100° C. a 120° C. which is required for the heat development. If the ball 8 is contacted to the photosensitive material of heat developing type to write a drawing, symbol, character or the like on the photosensitive material, the ball 8 contacts the photosensitive material to perform exposure and heat development simultaneously at the portion where the light illumination and heating are performed. In the case of the photosensitive material of activating type, the activation, exposure and heat developing are performed simultaneously and the optical changes such as color production occur so that the written drawing, symbol, character or the like appears.

This kind of recording is available not only in the case of the photosensitive material which is not exposed and not developed, but also in the case of the photosensitive material which is exposed and developed once. The reason is that a thermal energy which is sufficient to change the emulsion layer of the photosensitive material to the saturated condition is not given at the time of heat developing in general, even if the photosensitive material is exposed and then heat developed.

Figure 4:
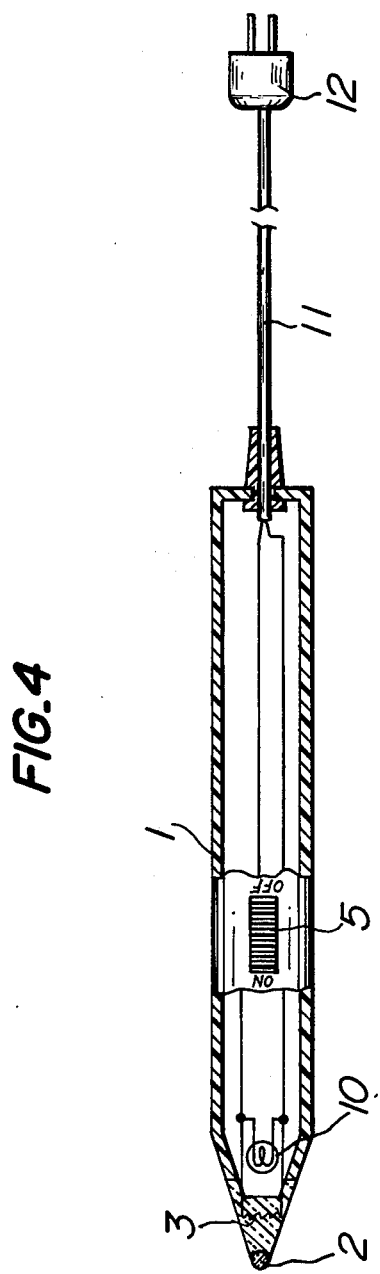
FIG. 4 is a longitudinal sectional view showing a fourth embodiment of a writing pen according to the present invention.

FIG. 4 shows a fourth embodiment of the present invention. In this embodiment, an internal power source such as a battery is not used and instead of the battery an external power source is used. In FIG. 4, the heater 3 or the parallel combination of the heater 3 and the light source 10 is coupled to a power supply source through a power supply cord 11 and a plug 12 which is connected to the cord 11.

The scope of the present invention is not limited to the above described embodiments and the present invention can be modified in various ways. For example, a device such as a thermister can be used to detect the temperature of the pen nib so that the pen nib is controlled thermally to maintain the temperature of the pen nib at a given temperature.

According to the present invention, the drawing, symbol, character or the like can be further written in the recorded film in a very simple manner. The present invention is applicable to various fields. For example, such characters as titles, reference numerals or symbols can be written in the recorded film for the convenience of film arrangement.

What is claimed is:

1. A writing pen for heat developing type photoconductive material comprising: a pen having a pen nib formed of material having good thermal conductivity and light-perviousness and adapted to be brought into contact with photosensitive heat developing type material; a light source in said pen for illuminating through said light pervious pen nib the photosensitive heat developing type material contacted by said pen nib; and a heater embedded in said pen nib and for heating at least a portion of said nib adapted to contact the photosensitive material to a predetermined temperature.

2. A writing pen as claimed in claim 1 wherein said pen nib includes a light-pervious rotatable ball tip seated in a light-pervious ball receptacle.

* * * * *